June 10, 1958     P. E. CLINGMAN     2,838,436
METHOD OF BONDING
Filed Nov. 3, 1955
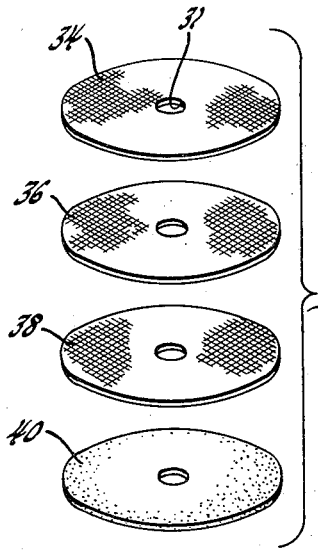
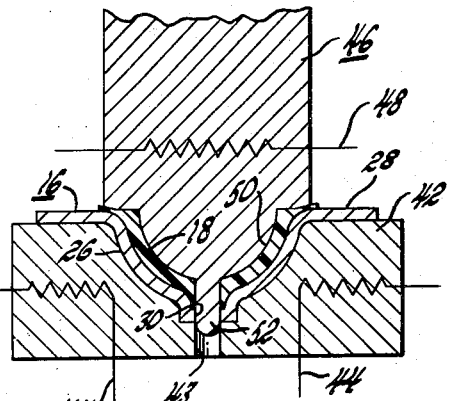
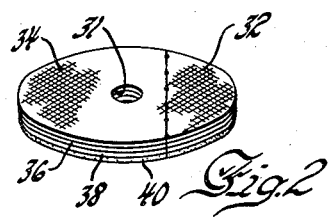
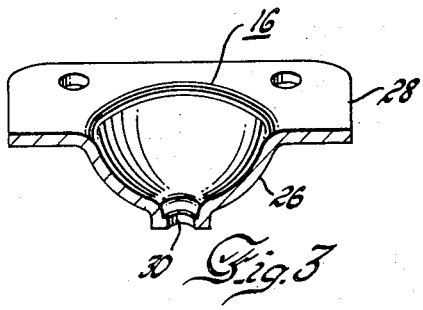
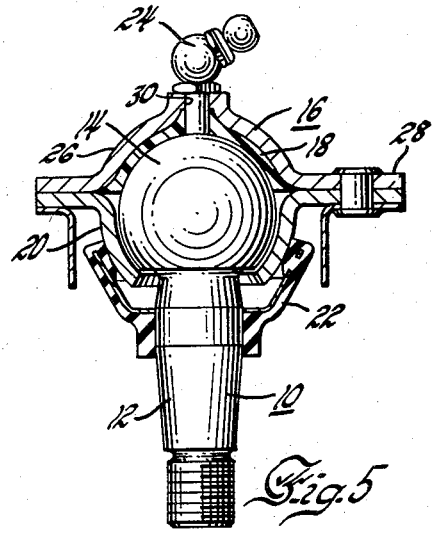
INVENTOR.
Paul E. Clingman
BY
HIS ATTORNEY

United States Patent Office 2,838,436
Patented June 10, 1958

2,838,436
METHOD OF BONDING
Paul E. Clingman, Dayton, Ohio, assignor to General Motors Corporation, Detroit, Mich., a corporation of Delaware
Application November 3, 1955, Serial No. 544,717
1 Claim. (Cl. 154—110)

This invention relates to ball joints and more particularly to a method for providing a non-metallic bearing surface within socket members in which the ball of a ball stud is supported.

A suitable ball and joint assembly for use in automobile suspensions and the like wherein the ball joint is subjected to relatively high impact loads may be made by encasing the steel ball of a ball stud in a metal socket or shell wherein an insert or liner of a high impact synthetic resin material is interposed between the ball and the shell. A highly satisfactory and economical ball and joint assembly of this type may be made by stamping or otherwise forming upper and lower complementary partially spherical shells, providing a non-metallic bearing surface on the inner surface of one or both of the shells, and jointing the shells about the ball of a ball stud.

It is an object of this invention to provide a method for forming a non-metallic bearing surface and the inner surface of a metal backing member which includes first preparing a unitary laminate made up of a fibrous outermost layer impregnated with a suitable cement and a plurality of other layers of fibrous material impregnated with an uncured thermosetting resin and thereafter placing the laminate against the backing member with the cement impregnated layer adjacent the backing member and subjecting the laminate and backing member to heat and pressure between complementary mold members sufficient to convert the laminate to an infusible mass and bond the laminate to the backing member. The method further includes steps whereby large numbers of laminate units may be readily manufactured by stacking a plurality of thermosetting resin impregnated fibrous layers with a cement impregnated layer as an outermost layer, uniting the layers at a plurality of points and cutting out laminates of a desired size so as to include at least one of the uniting points. The method is particularly applicable to the manufacture of non-metallic material lined partially spherical shells for ball joints wherein the laminate includes as an outer layer a fibrous sheet impregnated with a cement including a thermosetting and a thermoplastic resin and other layers impregnated with a thermosetting resin.

Further objects and advantages of the present invention will be apparent from the following description, reference being had to the accompanying drawings wherein a preferred form of the present invention is clearly shown.

In the drawings:

Figure 1 is an exploded view of a stock consisting of a plurality of layers of resin impregnated woven fibrous disks;

Figure 2 is a perspective view of a unitary resin impregnated stack;

Figure 3 shows an inverted upper shell of a ball and joint assembly viewed both in cross section and in perspective;

Figure 4 is a cross sectional side elevation view of a mold apparatus;

Figure 5 is a view of a ball and joint assembly.

Referring to the drawings, Figure 5 shows a ball and joint assembly made in accordance with the present invention which consists of a ball stud 10 including a stud 12 and a ball 14, a partially spherical upper shell or socket 16 having a high impact resin bearing material 18 molded therein and bonded thereto, a lower partially spherical shell 20 riveted to the upper shell and a flexible boot 22, flexibly sealing the stud 12 and the lower shell 20. A grease fitting 24 disposed in an aperture of the upper shell and grease grooves (not shown) which can be formed in inner peripheral surfaces of bearing layer 18 facilitate ball and joint lubrication.

The ball and joint assembly shown in Figure 5 is designed for use in an installation wherein a load is imposed by the ball against the upper shell 16, as for example in the lower ball joint of an automobile front wheel suspension, and accordingly the bearing layer 18 is bonded to the upper shell 16. In some installations, as for example in the upper ball joint of an automobile front wheel suspension, the load is imposed by the ball primarily against the lower shell 20 and accordingly the bearing material is bonded to the lower shell inner surface.

The upper shell 16 of a ball joint assembly of Figure 5 which is illustrated separately in an inverted position in Figure 3 may consist of a partially spherical portion 26 and a flanged portion 28 for attaching the shell to the complementary lower partially spherical shell and to a housing or automobile suspension in which it is installed. The partially spherical shell 26 may also have an aperture 30 disposed in the top thereof for receiving a suitable lubrication fitting. To provide a satisfactory bearing surface on the inner surface of partially spherical portion 26 of upper shell 16, a thermosetting resin laminate is formed and bonded to the inner surface of the shell by molding under heat and pressure.

In molding and bonding a bearing layer to a socket shell, preferably a plurality of layers of woven fabric material such as canvas are individually impregnated with a solution of stage A thermosetting resin and dried. Sheets of matted fibrous material such as paper may also be used for this purpose. Preferably the thermosetting resin is a phenol-aldehyde resin dissolved in a suitable solvent such as alcohol or acetone. The phenolic bodies may include phenol, cresols, xylenes and various suitable alkyl and aryl substituted phenols. The aldehyde bodies may include formaldehyde, acetaldehyde, benzaldehyde, furfural and other suitable compounds containing active methylene groups such as hexamethylene tetramine. Other thermosetting resins such as urea-aldehyde resins may also be used. The fibrous sheets may also be impregnated with a suitable resin in powdered form. In solvent form the resin may be applied by spraying, brushing or dipping as is well known in the art, and thereafter drying. These layers or sheets of fibrous material are then superimposed one upon the other to form a desired thickness or stack of material. A separate sheet or layer of fibrous material is impregnated with a suitable cement, dried and placed over the phenolic-aldehyde impregnated layers as an outer layer. This stack of material is then preferably sewed or otherwise suitably joined together as for example by stapling by parallel seams at spaced intervals. Thereafter stacks or wads of desired size are cut so as to include in each wad a portion of a seam or a united point whereby the fibrous layers of each disk are mechanically held together as shown in Figure 2 and may be handled as a unit. The stacks 32 as shown in the example of Figure 1 consist of a plurality of thermosetting resin impregnated layers 34, 36 and 38 and an outer cement impregnated layer 40. The stacks shown in Figure 2 are also provided with centrally disposed apertures 31 corresponding in size to apertures 30 of member 16, the purpose of which will be obvious from the following description.

The cement referred to above for impregnating the outer layer 40 is preferably a mixture in suitable proportions of a thermoplastic base resin and a thermosetting base resin dissolved in a suitable solvent. The thermoplastic base resin may be a synthetic rubber such as polychloroprene (neoprene) and butadiene acrylonitrile copolymer. The thermosetting resin may be a phenolic aldehyde resin as described above or a urea-aldehyde resin dissolved in a suitable solvent. In compounding the cement the synthetic rubber portion may be compounded in accordance with standard rubber compounding technique. Calcined magnesia may be added to prevent scorching of the material during the compounding operation, and other fillers such as finely divided asbestos, carbon black, and clays may be added as is well known in the rubber compounding art as well as accelerators and vulcanizing agents such as zinc oxide and sulfur, an age resisting antioxidant such as phenyl beta naphthylamine, and a fluxing agent and accelerator such as wood resin. The resin portion of the cement may be added to the rubber portion while the latter is undergoing mastication or mixing and may be added in concentrated form or in solvents such as acetone, ketones, methylacetate, toluol or alcohol depending on the thermosetting resin used. After the thermosetting resin is mixed into the rubber portion, a suitable solvent may be added to the mix to reduce the cement to a desired consistency, as for example a combination of naphtha and ethyl alcohol in the case of neoprene and a combination of ethylene dichloride and chlorobenzene in the case of butadiene-acrylonitrile copolymer. These cements will cure in about 15 minutes at about 300° F.

The upper shell 16 is next placed within the cavity of a lower mold member or drag 42 which preferably has heating means associated therewith, as for example, electrical heating elements 44 as shown in Figure 4 and a centrally disposed aperture 43 corresponding to aperture 30 of the shell. The resin and cement impregnated layers of stack 32 are placed over the cavity of the partially spherical shell with the cement impregnated layer facing shell 16. A male mold member 46 having a heating means, such as an electrical heating element 48, a partially spherical portion 50 of the same radius as ball 14, and a cylindrical portion 52 of a slightly smaller diameter than aperture 30, is disposed over the lower mold portion 42, with the projecting portion 52 being aligned with apertures 30 and 43 of the shell and lower mold portion, respectively and the aperture 31 of the stack 32. The mold members are heated to a desired curing temperature for the resin and the cement and the upper or male mold member is forced into the cavity of the shell 16 carrying therewith the stack 32 into the cavity whereby the stack 32 is molded into an infusible laminate or liner 18 due to the curing of the thermosetting resin and is simultaneously bonded to the shell 16 due to the curing of the cement and further is formed to have an inner radius desired to subsequently receive ball 14. In the molding process the thermosetting resin of each layer of fibrous resin impregnated material fuses together and flows into the interstitial voids of the fibrous material so as to form, on curing, an infusible mass reinforced by or filled by a plurality of fibrous layers. In the molding process the thermosetting resin of the cement fuses with the thermosetting resin of the thermosetting resin impregnated layers while the synthetic rubber portion adheres strongly to the metal shell whereby the laminate or liner 18 is bonded strongly to the shell.

As previously indicated the laminate or liner 18 may be provided with oil grooves (not shown) extending from the centrally disposed grease fitting aperture 30 to the greatest diameter portions by providing corresponding ridges or projections on the partially spherical portion 50 of upper mold member 46. Further if desired to provide an additional mechanical lock between the shell 16 and the laminate or liner 18, the shell 16 may be provided with recesses or apertures (not shown) suitably disposed whereby the resin on molding will flow into such recesses or apertures during the molding process. All of these expedients may be accomplished during the molding step as is well known in the art.

The phenolic-aldehyde fibrous laminate utilized in the present invention is ideally suited for the present purpose due to its high compressive and impact strength, durability, inertness to oils, non-absorptiveness and low coefficient of expansion. However various well known thermosetting resins impregnates may be similarly used for various applications.

The present method of applying laminates to metal backing members is ideally suited for mass production techniques since only a single, joined, stack or wad of laminating and bonding material need be handled in loading a mold thus obviating the need for handling separate layers of laminating material in loading the mold and separately applying an adhesive layer to the metal backing member on which the laminate is formed and to which it is secured. Further the method involves forming a large number of wads or stacks of unitary laminating assemblies from stacks of large dimensions requiring a single stacking and sewing or fastening operation.

While the form of embodiment of the invention as herein disclosed constitutes a preferred form, it is to be understood that other forms might be adopted, as may come within the scope of the claim which follows.

What is claimed is as follows:

In a method of forming and bonding a concave bearing liner into a ball joint socket to withstand relatively high impact load transmitted by a ball to be fitted into the socket, the steps, comprising, providing a preformed apertured metal socket member having a partially spherical concave portion with one side adapted to become a bearing support surface with a lubricating opening therein, forming a non-metallic liner and bearing surface for the one side of said partially spherical concave portion including first preparing a unitary flat laminate stack of fibrous discs having an uncured underlayer impregnated with a compounded cement of both thermoplastic synthetic rubber and thermosetting resin and other layers mechanically joined thereto each impregnated with only a thermosetting resin, placing the uncured flat stack of discs adjacent to said partially spherical concave portion of said socket member, and simultaneously applying heat and pressure through a molding means contoured complementary to said spherical portion of said preformed apertured metal member and having heating elements associated therewith to cure and form said bearing liner thermoplastic and thermosetting resin into a concave bearing liner for said ball joint socket to be subjected to relatively high impact loads, said applying heat and pressure resulting in simultaneously in a single operation transforming the flat stack of discs into an infusible concave bearing surface liner while molding, curing, and bonding said compounded cement underlayer to both said metal spherical portion and said thermosetting resin impregnated layers other than said underlayer to form a bearing socket adapted to be subjected to relatively high impact loads, said preparing a unitary flat laminate stack of fibrous discs including mechanically uniting layers of resin impregnated fibrous material with the thermoplastic and thermosetting resin impregnated underlayer by stitching together the flat stack in a plurality of points not all to go into the partially spherical portion of said ball joint socket and cutting out flat laminate stacks so as to include at least one of the stitched points for holding the discs together until said impregnated underlayer and other layers are cured and formed by heat and pressure bonding as a unitary fused concave bearing liner for said partially spherical concave portion.

References Cited in the file of this patent
UNITED STATES PATENTS

| | | |
|---|---|---|
| 1,337,993 | Bird | Apr. 27, 1920 |
| 1,844,512 | Mains | Feb. 9, 1932 |
| 2,482,981 | Kamrass | Sept. 27, 1949 |
| 2,628,144 | Loetscher | Feb. 10, 1953 |